United States Patent Office 3,463,766
Patented Aug. 26, 1969

3,463,766
PROCESS FOR PREPARING 1,4 CIS POLYBUTADIENE USING AlBr$_3$, AN ALUMINUM MONOHYDRIDE AND A COBALT COMPOUND
Alessandro Mazzei, Gabriele Lugli, and Walter Marconi, San Donato Milanese, Italy, assignors to Snam S.p.A., Milan, Italy, a company of Italy
No Drawing. Filed Dec. 2, 1964, Ser. No. 415,498
Claims priority, application Italy, Dec. 9, 1963, 25,138/63
Int. Cl. C08d 1/14, 3/08
U.S. Cl. 260—94.3                            5 Claims

ABSTRACT OF THE DISCLOSURE 1,4 cis polybutadiene is prepared by contacting butadiene with a multicomponent catalyst consisting of (1) a cobalt compound, (2) an aluminum bromide, and (3) an aluminum monohydride of the general formula HA1XY.Z where X is a halogen, Y is a halogen or a residue of a secondary amine and Z is a Lewis base, the Z compound not being present if Y is a residue of a secondary amine, the molar ratio between the monohydride and the halide being between 1.1 and 1.6, the molar ratio between the monohydride and the cobalt compound is higher than 100.

---

It is an object of the present invention to provide a process for polymerizing butadiene into 1,4 cis polybutadiene by employing a catalyst system comprising an aluminum monohydride, an aluminum halide and a cobalt compound soluble in the reaction medium.

In the U.S. patent application No. 208,570, now Patent No. 3,245,976, granted Apr. 12, 1966 to the assignee of the present application, a process was disclosed for polymerizing butadiene to polymers having prevailingly 1,4 cis structure by employing a catalyst consisting of an aluminum hydride and of a compound of a transition metal.

From the disclosure one learns that the use of aluminum hydrides in the presence of compounds of metals of the 4th and 5th groups permits obtaining the polymer with elevated yields, whilst the yields diminish if there is present a compound of a metal of the 8th group as a compound of a transition metal.

The polymerization of dienes by employing cobalt compounds jointly with reducing aluminum compounds had already been disclosed by British Patent No. 812,152 of Oct. 7, 1955. Subsequently it was observed that the use of some of those catalysts systems in the polymerization of butadiene was leading to polymers having 1,4 cis structure.

The use of cobalt has been reported also in subsequent patents such as French Patent 1,242,576 where the possibility is disclosed of polymerizing the butadiene in the presence of olefins and such as French Patent 1,227,321 where the use of cobalt is provided only for the case of reducing aluminum compounds containing only one halogen atom.

More particularly the aluminum compounds that according to the cited patents should have formed 1,4 cis polybutadiene should correspond to the general formulae: $R_1R_2AlX$ where $R_1$ and $R_2$ are equal or different and each of them represents a hydrogen or a hydrocarbon radical and X represents a halogen atom.

However the use of aluminum hydrides as constituents of catalyst systems containing cobalt compounds for the polymerization of butadiene was not exemplified previously except for the above-mentioned U.S. patent application No. 208,570 in which the polymerization of butadiene is described with binary catalyst systems consisting of a complexed aluminum dichloride monohydride and of a soluble cobalt compound. Under such conditions however the yield of polymer was not high enough.

Unexpected high yields of polybutadiene with substantial 1,4 cis chain-linking are obtained by the process forming the subject matter of the present invention by employing catalyst system consisting of:

(a) a soluble cobalt compound
(b) an aluminum hydride having general formula HA1XY.Z where X is a halogen, Y is a halogen or the residue of a secondary amine and Z is a Lewis base such as ether or amine, said base not being present when Y is a residue of a secondary amine
(c) an aluminum halogen.

The catalyst system so constituted is characterized in that in it the molar ratio between aluminum hydride and aluminum halide is from 1.1 to 1.6 preferably from 1.2 and 1.3 and in that at no time the cobalt salt enters into contact with the hydride before the latter has reacted with the Lewis acid.

Such a procedure is critical when the aluminum hydrides are employed as catalysts in the polymerization of butadiene in the presence of cobalt compounds and is unexpected since in the prior literature for instance in French Patent 1,242,576 normally the cobalt compound can be put directly into contact with the aluminum compound and the effective catalyst is obtained by aging.

If instead the aluminum hydrides of the instant invention are put into direct contact with the cobalt compound the reaction product that is obtained has scarce catalytic properties.

On the other hand it ought to be borne in mind that to our knowledge the aluminum monohydrides are the only aluminum hydrides that are active in the polymerization of butadiene in the presence of cobalt compounds.

In fact as will better appear in the examples the catalyst systems consisting of aluminum dihydrides or aluminum trihydrides in the presence or not of aluminum halides do not give any appreciable results with cobalt compounds.

Also without discussing the reaction mechanism, on the basis of the experimental results one can suppose that the true catalytic constituent consists of the product of the reaction of the cobalt compound with a complex aluminum hydride obtained by reaction of the dihalogen monohydride of aluminum, or of the halogen-amino monohydride, with the aluminum halide.

The soluble compounds of di- and tri-valent cobalt preferably used are the salts of organic acids such as cobalt acetyl-acetonate, 2-ethyl hexanoate of cobalt, cobalt naphthalate, cobalt laurylate, cobalt stearate etc. and the inorganic salts such as the chloride, bromide, iodide, nitrate etc. complexed with organic compounds such as pyridine, piperidine, etc.

For aluminum hydrides there are advantageously utilized the di-chloro-aluminum monohydride complexed with ethyl ether, the di-bromo-aluminum monohydride complexed with tri-ethyl amine, the di-chloro-aluminum monohydride complexed with trimethyl amine, aluminum monochloro-mono-diethylamino monohydride.

The aluminum halides preferably employed are the bromide and the iodide.

The reaction is preferably carried out in inert hydrocarbon-type solvents such as benzene, toluene, cyclohexane, n-heptane etc.

The polymerization is carried out at temperatures of from $-15$ to $+60°$ C. preferably from 0 to 20° C.

As said above, the molar ratio between aluminum hydride and aluminum halide should be within well-defined limits since an increase of the amount of halide directs the polymerization towards an unsoluble cross-linked polymer which therefore cannot be utilized on an industrial scale; on the other hand, an increase of the hydride makes the yields much lower.

The molar ratio between aluminum hydride and cobalt compound should be higher than 100 and preferably of from 120 to 700.

In order better to illustrate the present invention, the following examples are given which should be considered without limitation.

Examples 1-4

In these examples the butadiene is polymerized with a catalyst system formed by $AlHCl_2 \cdot (C_2H_5)_2O$, $AlBr_3$ and $CoA_2$ (A=acetyl acetonate residue) by varying the ratio $$AlHCl_2 \cdot (C_2H_5)_2O / AlBr_3$$

In a reaction tube with a lateral cock, previously dried in an oven, the air is taken away by suction and subsequent introduction of $N_2$; the operation is repeated three times and then $N_2$ is passed during all of the subsequent stages in order to avoid any contact with air of the reactants used. Then are introduced in order the solvent, the aluminum etherate hydrochloride, and the aluminum bromide in benzenic solution, by use of a graduated piston-pipette. The reaction tube is cooled down to 0° C. and butadiene and cobalt acetyl acetonate are introduced in order. The stopper is then put in the tube and the reaction tube is plunged into a thermostatic bath at 14° C. After 25 minutes the content of the reaction tube is poured into a litre of methyl alcohol containing about 1% of antioxidant; the coagulated polymer has rubbery appearance; it is dried under vacuum.

The results and operating conditions of this series of experiments are reported in Table 1.

there are introduced in the order of succession as listed, 75 ml. of benzene, 1.76 mmoles of $AlHBrN(CH_3)_2$, 1.36 mmoles of $AlBr_3$, 11 g. of butadiene, 0.0059 of $CoA_2$. Polymerization is effected at 20° C.; the polymer coagulates after 16 hrs. and is dried under vacuum at room temperature. 8 g. of rubbery polymer is obtained which on I.R. analysis shows the following structure: 94% 1,4 cis; 3% 1,4 trans; 3% 1,2; 90% insatur. total 90%.

Example 11

Butadiene is polymerized with a system formed by $AlHBr_2$-ether, $AlBr_3$, $CoA_2$ with molar ratios $AlHBr_2$-ether/Co=400; $AlHBr_2$-ether/$AlBr_3$=1. Using the same technique of Example 1, there are introduced in order 60 ml. of benzene; $AlHBr_2$-ether 2.03 mM.; $AlBr_3$ 542 mg.; $C_4H_6$ 10 g. and $CoA_2$ 0.0051 mM. Polymerization is conducted at 0° C. for 3 hrs. 7.3 g. of polymer is obtained having the following structure: 1,4 cis 97%; 1,4 trans 2%; 1,2 1%; insatur. total 95%.

$$[\eta]_{toluene}^{30°} = 3.16; \quad M.W. = 3.45 \cdot 10^5$$

Example 12

Butadiene is polymerized with a catalyst system formed by $AlHCl_2 \cdot N(CH_3)_3$, $AlBr_3$, $CoA_2$. With the same technique and apparatus as used with Example 1, there are introduced in order; 50 ml. of benzene, 0.89 mmole of $AlHCl_2N(CH_3)_3$; 0.684 mmole of $AlBr_3$; 15 g. of butadiene, 0.0059 mmole of Co acetyl acetonate. Polymerization is effected at 14° C., the polymer coagulates after 90 minutes and is dried under vacuum. 10.3 g. of polymer is obtained (66% of yield) which on I.R. analysis dis-

TABLE 1

| Ex. | Catalyst, mmoles | Cocatalyst, mmoles | Lewis Ac., mmoles | Al/Co | Al/Lewis Acid | Solvent, cc. | Monomer | T., °C. | Duration, min. | Yield G. | Yield Percent | 1,4 cis | 1,4 trans | 1,2 | Insatur. total |
|---|---|---|---|---|---|---|---|---|---|---|---|---|---|---|---|
| 1 | CoA₂, 0.0059 | AlHCl₂.Ether, 4.21 | AlBr₃, 3.55 | 700 | 1.2 | 80 | 11 | 14 | 25 | 8 | 72 | 96 | 2 | 2 | 90 |
| 2 | CoA₂, 0.0059 | AlHCl₂.Ether, 2.65 | AlBr₃, 2.14 | 450 | 1.2 | 70 | 11 | 14 | 25 | 9.4 | 85 | 96 | 2 | 2 | 92 |
| 3 | CoA₂, 0.0059 | AlHCl₂.Ether, 1.77 | AlBr₃, 1.47 | 300 | 1.2 | 80 | 11 | 14 | 25 | 8.2 | 74 | 96 | 2 | 2 | 94 |
| 4 | CoA₂, 0.0059 | AlHCl₂.Ether, 0.72 | AlBr₃, 0.59 | 120 | 1.2 | 70 | 11 | 11 | 25 | 5.5 | 50 | 96.5 | 2.5 | 1 | 90 |

A=acetyl acetonate residue.

Examples 5-9

In these examples the butadiene is polymerized with the same catalyst of the preceding examples, while varying however the ratio $$AlHCl_2 \cdot (C_2H_5)_2O / AlBr_3$$

and keeping constant the ratio $$AlHCl_2 \cdot (C_2H_5)_2O / Co$$

Using the same apparatus and technique of Examples 1-4, the components of the catalyst are introduced, in the order of succession indicated, into the reactor tube, under $N_2$. The polymerization is concluded at 0° C. for 165 minutes, coagulation is effected in methanol and drying is effected under vacuum, at room temperature, of the polymer obtained.

The results and operating conditions of this series of tests are reported in Table 2.

plays the following structure: 96% 1,4 cis; 2% 1,4 trans; 2% 1,2; 91% insatur. total.

Example 13

Butadiene is polymerized with a catalyst system formed by $AlHCl_2 \cdot (C_2H_5)_2O$, $AlI_3$ and $CoA_2$. Using the apparatus and technique of Example 1, there are introduced into the reaction tube in order 50 ml. of benzene, 0.9 mmoles of $AlHCl_2 \cdot N(CH_3)_3$, 0.68 mmole of $AlI_3$, 10 g. of butadiene, 0.0059 mmole of $CoA_2$. The polymerization is conducted at 14° C. for 50 hrs., the product is coagulated and the polymer is dried under vacuum at room temperature. There are obtained 8.6 g. of rubbery polymer (86% yield) which on I.R. analysis displays prevailing 1,4 cis structure.

TABLE 2

| Ex. | Catalyst, mmoles | Cocatalyst, mmoles | Lewis Ac., mmoles | Catalyst/Cocatal. | Cocatalyst/Lewis Ac. | Solvent, ml. | Monomer, g. | T., °C. | Duration, min. | Yield G. | Percent | 1,4 cis | 1,4 trans | 1,2 | Insatur. total |
|---|---|---|---|---|---|---|---|---|---|---|---|---|---|---|---|
| 5 | CoA₂, 0.0051 | AlHCl₂(C₂H₅)₂O, 2.01 | AlBr₃, 1.845 | 400 | 1.1 | 60 | 9 | 0 | 165 | 9 | 100 | 96 | 2 | 2 | |
| 6 | CoA₂, 0.0051 | AlHCl₂.(C₂H₅)₂O, 2.01 | AlBr₃, 1.695 | 400 | 1.2 | 60 | 9 | 0 | 165 | 9 | 100 | 97 | 2 | 1 | 93 |
| 7 | CoA₂, 0.0051 | AlHCl₂.(C₂H₅)₂O, 2.01 | AlBr₃, 1.565 | 400 | 1.3 | 60 | 10 | 0 | 165 | 6.5 | 65 | 98 | 1 | 1 | 93 |
| 8 | CoA₂, 0.0051 | AlHCl₂.(C₂H₅)₂O, 2.01 | AlBr₃, 1.450 | 400 | 1.4 | 60 | 10 | 0 | 165 | 4 | 40 | 97 | 2 | 1 | 89 |
| 9 | CoA₂, 0.0051 | AlHCl₂.(C₂H₅)₂O, 2.01 | AlBr₃, 1.355 | 400 | 1.5 | 60 | 10 | 0 | 165 | 0.8 | 8 | 97 | 2 | 1 | 89 |

Example 10

The butadiene is polymerized with a catalyst system formed by $AlHBrN(CH_3)_2$, $AlBr_3$, $CoA_2$.

Using the same apparatus and technique of Example 1,

Example 14

Butadiene is polymerized with a catalyst system formed by $AlHCl_2$-ether, $AlBr_3$, $CoCl_2$-pyridine. With the same technique and apparatus as used in Example 1, there are introduced into the reaction tube, in order 50 ml. of benzene, 2.4 mmoles of AlHCl$_2$-ether, 1.82 mmoles of AlBr$_3$, 0.0059 mmole of CoCl$_2$-pyridine. Polymerization is carried out at 14° C. for 55 minutes, the polymer is coagulated and is dried under vacuum at room temperature. There are obtained 9 g. of rubbery polymer (90% yield) which on infrared analysis displays the following structure: 95% 1,4 cis; 2% 1,4 trans; 3% 1,2; 92% insatur. total.

Example 15

Butadiene is polymerized with a catalyst system consisting of AlHCl$_2$.(C$_2$H$_5$)$_2$O, AlBr$_3$ and 2-ethyl hexanoate of cobalt. Following the same technique of Example 1, there are introduced in order into the reactor tube 50 ml. of benzene, 4.12 mmoles of AlHCl$_2$(C$_2$H$_5$)$_2$O, 3.18 mmoles of AlBr$_3$, 10 g. of butadiene, 0.0059 mmole of 2-ethyl hexanoate of cobalt. Polymerization is carried out at 0° C.; after 40 minutes time the reaction is stopped; the product is coagulated in methanol and is dried in an oven under vacuum at room temperature. There are obtained 7.5 g. of polymer (75%) which on I.R. analysis displays the following structure: 97.5% 1,4 cis; 1.5% 1,4 trans; 1% 1,2; 93% insatur. total.

Example 16

Butadiene is polymerized with a catalyst system constituted by AlHCl$_2$(C$_2$H$_5$)$_2$O, AlBr$_3$ and CoA$_3$. Using the same method of Examples 1–4, there are introduced into the reaction tube in order 50 ml. of benzene, 0.886 mmole of AlHCl$_2$(C$_2$H$_5$)$_2$O, 0.68 mmole of AlBr$_3$, 6.5 g. of butadiene, 0.0059 mmole of CoA$_3$. Polymerization is carried out at 0° C. and after 6 hrs. the polymer coagulates and is dried in a vacuum oven at room temperature. There are obtained 3.8 g. (58%) of polymer which on I.R. analysis displays the following structure: 97% 1,4 cis; 2% 1,4 trans; 1% 1,2; 94% insatur. total.

Examples 17–18

The operation is carried out by the same technique of the preceding examples and butadiene is polymerized by using as an aluminum hydride the monodimethylamino aluminum dihydride. The compositions of the catalyst are reported here below:

| Ex. No. | AlH$_2$N(CH$_3$)$_2$, mmol. | AlBr$_3$, mmoles | CoA$_2$, mmoles | AlH$_2$N(CH$_3$)$_2$/AlBr$_3$ | AlH$_2$N(C$_2$H$_5$)$_2$/CoA$_2$ |
|---|---|---|---|---|---|
| 17 | 2 | 1.54 | 0.005 | 1.3 | 400 |
| 18 | 0.75 | 0.58 | 0.005 | 1.3 | 150 |

15 ml. of butadiene are subjected to polymerization at 0° C. After 20 hours time the product is poured into methanol and no polymer is obtained.

Examples 19–20

The operation is carried out with the technique of the preceding examples, employing aluminum trihydride complexed, with triethylamine, as an aluminum hydride, in polymerizing butadiene. The compositions of the catalyst are reported here below:

| Ex. No. | AlH$_3$.N(C$_2$H$_5$)$_3$, mmoles | AlBr$_3$, mmoles | CoA$_2$, mmol. | AlH$_3$.N(C$_2$H$_5$)$_3$/AlBr$_3$ | AlH$_3$.N(C$_2$H$_5$)$_3$/CoA$_2$ |
|---|---|---|---|---|---|
| 19 | 2 | 4 | 0.005 | 0.5 | 400 |
| 20 | 2 | 1.54 | 0.005 | 1.3 | 400 |

18 ml. of butadiene are subjected to polymerization at 0° C. After 17 hours time, the product is poured into methanol: no polymer is obtained.

Examples 21–26

By operating according to the technique of the preceding examples, butadiene is polymerized while employing the catalyst systems reported here below:

| Ex. No. | AlH$_2$Cl(C$_2$H$_5$)$_2$O, mmoles | AlBr$_3$, mmoles | CoA$_2$, mmoles | AlH$_2$Cl.(C$_2$H$_5$)$_2$O/AlBr$_3$ | AlH$_2$Cl.(C$_2$H$_5$)$_2$O/CoA |
|---|---|---|---|---|---|
| 21 | 2 | 2.5 | 0.005 | 0.8 | 400 |
| 22 | 2 | 2 | 0.005 | 1 | 400 |
| 23 | 2 | 1.57 | 0.005 | 1.2 | 400 |
| 24 | 0.25 | 0.3 | 0.005 | 0.8 | 50 |
| 25 | 0.25 | 0.25 | 0.005 | 1 | 50 |
| 26 | 0.25 | 0.2 | 0.005 | 1.2 | 50 |

19 mol of butadiene are subjected to polymerization at 0° C. After 22 hours time the product is poured into methanol: no polymer is obtained.

Example 27

According to the technique of the preceding examples butadiene as polymerized employing the same catalyst of Example 1 but with a ratio AlHCl$_2$(C$_2$H$_5$)$_2$O/AlBr$_3$=2. After 21 hour time at 0° C. from 19 ml. of butadiene, no polymer is obtained.

Example 28

According to the technique of the preceding example butadiene is polymerized employing the catalyst of the preceding example but with a ratio $$AlHCl_2(C_2H_5)_2O/AlBr_3=0.8$$

After twenty minutes time at 0° C. from 15 ml. of butadiene a cross-linked polymer is obtained insoluble in CS$_2$.

The examples reported here above are given, as already said, without limitation. They illustrate preparation of 1,4 cis polybutadiene with the catalyst systems comprising co-catalysts of formula AlHXY.Z as defined hereinbefore. In particular, said examples show that only compounds of said formula are suitable co-catalysts whilst aluminium dihydrides and trihydrides are not. It has been shown that the catalysts disclosed in British Patent 812,-152, French Patent 1,227,321 and French Patent 1,242,-576 are ineffective for a polymerization into 1,4 cis of butadiene if related to the aluminum compounds provided with the instnt invention. The examples substantially show over the prior art three fundamental facts:

(1) The non-equivalence of aluminum hydrides with aluminum alkyls. In fact it is known that aluminum alkyls jointly with cobalt compounds produce 1,4 cis polybutadiene whilst the substitution of the alkyl groups with a hydrogen as for instance in Al(C$_2$H$_5$)$_2$Cl does not lead to any effective catalyst.

(2) The very hydrides are not equivalent to one another since some of them are wholly ineffective.

(3) The hydrides capable of polymerizing into 1,4 cis are, as compared to the ineffective ones, weaker reducing agents.

Also the considerable importance has been shown that the molar ratio AlHXY.Z/AlHal$_3$(Hal=halogen) has, with respect to obtaining 1,4 cis polybutadiene. In fact, values of said ratio that are lower than unity lead to cross-linked insoluble polymers unsuitable for succeeding processing and, therefore, to products industrially without interest; if instead said ratio is higher than the value 2, when the very process is non-interesting from an industrial stand-point. Hence the present invention is characterized by the contemporaneous realization of three critical factors:

(1) Use of well-defined compounds as co-catalysts;
(2) Suitable ratios of co-catalyst/aluminum halide;
(3) Use of the components of the catalyst system in a well-determined order.

We claim:

1. In a process for preparing 1,4 cis polybutadiene from butadiene, using a catalytic system comprising
    a soluble compound of cobalt,
    a monohydride of aluminum of the general formula HAlXY.Z where X is a halogen, Y is selected from the group consisting of halogens and residues of secondary amines and Z is a Lewis base selected from the group consisting of ethers and amines, the compound Z not being present if Y is a residue of a secondary amine, the improvement which consists in adding aluminum bromide, before mixing the hydried of aluminum and the cobalt compound, in an amount such that the ratio between the hydride of aluminum and the aluminum bromide is between 1.1 and 1.6 to 1.

2. A process according to claim 1 wherein the aluminum hydride is selected from dichloro aluminum monohydride complexed with ethy lether, di-bromo aluminum monohydride complexed with triethyl aluminum, dichloro aluminum monohydride complexed with trimethyl amine, monochloro monodiethyl amino aluminum monohydride, monobromo monodimethylamino aluminum monohydride.

3. A process according to claim 1, wherein the molar ratio between the aluminum monohydride and the aluminum bromide is between 1.2 and 1.3, and the molar ratio between the aluminum monohydride and the cobalt compound is between 120 and 700 to 1.

4. A process according to claim 3, wherein polymerization takes place at a temperature between 0 and 20° C.

5. A process according to claim 3, wherein the catalyst is obtained by first reacting the aluminum monohydride and the aluminum bromide, and then reacting the cobalt compound with the product of the reaction of the aluminum hydride and the aluminum halide.

References Cited

UNITED STATES PATENTS

| 3,066,126 | 11/1962 | Porter | 260—94.3 |
| 3,222,348 | 12/1965 | Duck et al. | 260—94.3 |
| 3,245,976 | 4/1966 | Marconi et al. | 260—94.3 |

JOSEPH L. SCHOFER, Primary Examiner

R. A. GAITHER, Assistant Examiner